(12) United States Patent
Nguyen

(10) Patent No.: US 10,577,923 B2
(45) Date of Patent: Mar. 3, 2020

(54) LEAK DETECTION VIA DOPPLER SHIFT DIFFERENCES IN MOVING HYDROPHONES

(71) Applicant: HALLIBURTON ENERGY SERVICES, INC., Houston, TX (US)

(72) Inventor: Nam Nguyen, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 245 days.

(21) Appl. No.: 15/541,073

(22) PCT Filed: Mar. 20, 2015

(86) PCT No.: PCT/US2015/021669
§ 371 (c)(1),
(2) Date: Jun. 30, 2017

(87) PCT Pub. No.: WO2016/153460
PCT Pub. Date: Sep. 29, 2016

(65) Prior Publication Data
US 2017/0356286 A1      Dec. 14, 2017

(51) Int. Cl.
*E21B 47/10* (2012.01)
*G01V 1/50* (2006.01)
*G01V 1/52* (2006.01)

(52) U.S. Cl.
CPC .............. *E21B 47/101* (2013.01); *G01V 1/50* (2013.01); *G01V 1/52* (2013.01);
(Continued)

(58) Field of Classification Search
CPC .......... E21B 47/101; G01V 1/50; G01V 1/52; G01V 2210/1234; G01V 2210/1299; G01V 2210/1429; G01V 2210/144
(Continued)

(56) References Cited

U.S. PATENT DOCUMENTS

| 3,261,200 A | 7/1966 | Long |
| 3,838,593 A | 10/1974 | Thompson |

(Continued)

FOREIGN PATENT DOCUMENTS

| CA | 1120788 | 3/1982 |
| CN | 103575928 | 2/2014 |

(Continued)

OTHER PUBLICATIONS

European Patent Application No. 15886623.6, Extended European Search Report, dated Nov. 9, 2018, 7 pages.

(Continued)

*Primary Examiner* — Nicole Coy
*Assistant Examiner* — Dany E Akakpo
(74) *Attorney, Agent, or Firm* — Kilpatrick Townsend & Stockton LLP

(57) ABSTRACT

A leak-detecting assembly can include an array of hydrophones. The array can be moved within a hydrocarbon well. A variation in the Doppler shift caused by a stationary acoustic source (such as a leak) while the array moves towards and away from that source can be determined based on information from the array of hydrophones. The assembly can be associated with a passive system that captures acoustic signals directly from the source or leak and estimates a location of the source or leak based on measurement of Doppler shift in each receiver.

21 Claims, 7 Drawing Sheets

(52) U.S. Cl.
CPC .............. *G01V 2210/1234* (2013.01); *G01V 2210/1299* (2013.01); *G01V 2210/144* (2013.01); *G01V 2210/1429* (2013.01); *G01V 2210/65* (2013.01)

(58) Field of Classification Search
USPC ........................................................ 181/105
See application file for complete search history.

(56) References Cited

U.S. PATENT DOCUMENTS

| | | | |
|---|---|---|---|
| 3,992,924 | A | 11/1976 | Ells et al. |
| 4,114,721 | A * | 9/1978 | Glenn, Jr. .............. E21B 47/101 181/102 |
| 4,130,010 | A | 12/1978 | Wonn |
| 4,172,379 | A | 10/1979 | Van Tilburg et al. |
| 4,176,543 | A | 12/1979 | Nolte et al. |
| 4,905,210 | A | 2/1990 | Owen |
| 5,349,568 | A | 9/1994 | Kupperman et al. |
| 5,974,862 | A | 11/1999 | Lander et al. |
| 6,789,411 | B2 | 9/2004 | Roy |
| 7,219,762 | B2 | 5/2007 | James et al. |
| 7,523,666 | B2 | 4/2009 | Thompson et al. |
| 8,665,101 | B2 | 3/2014 | Solomon |
| 8,755,250 | B1 | 6/2014 | Ruffa |
| 2003/0010495 | A1 | 1/2003 | Mendez et al. |
| 2005/0034530 | A1 | 2/2005 | Han et al. |
| 2010/0268489 | A1 | 10/2010 | Lie et al. |
| 2011/0103189 | A1 | 5/2011 | Paulson |
| 2012/0007744 | A1 | 1/2012 | Pal et al. |
| 2012/0018145 | A1 * | 1/2012 | Wheater ............... E21B 17/206 166/241.5 |
| 2013/0144166 | A1 | 6/2013 | Specht et al. |
| 2013/0199272 | A1 | 8/2013 | Khalifa et al. |
| 2013/0255940 | A1 * | 10/2013 | Rochford ................ E21B 47/00 166/255.2 |

FOREIGN PATENT DOCUMENTS

| | | |
|---|---|---|
| EP | 2208039 | 7/2010 |
| JP | 2000258281 | 9/2000 |
| WO | 2009048340 | 4/2009 |

OTHER PUBLICATIONS

Couvreur et al., "Doppler-Based Motion Estimation for Wide-Band Sources from Single Passive Sensor Measurements", IEEE, 1997, 3537-3540.

Khulief et al., "On the In-Pipe Measurements of Acoustic Signature of Leaks in Water Pipelines", Proceedings of the ASME 2012 International Mechanical Engineering Congress & Exposition vol. 12, Nov. 9-15, 2012, 7 pages.

International Patent Application No. PCT/US2015/021669 , "International Search Report and Written Opinion", dated Dec. 3, 2015, 10 pages.

Weatherford , "Leak Detection", available at www.weatherford.com/Products/Production/PipelineSpecialityServices/LeakDetection/, at least as early as Aug. 18, 2014, 1 page.

* cited by examiner

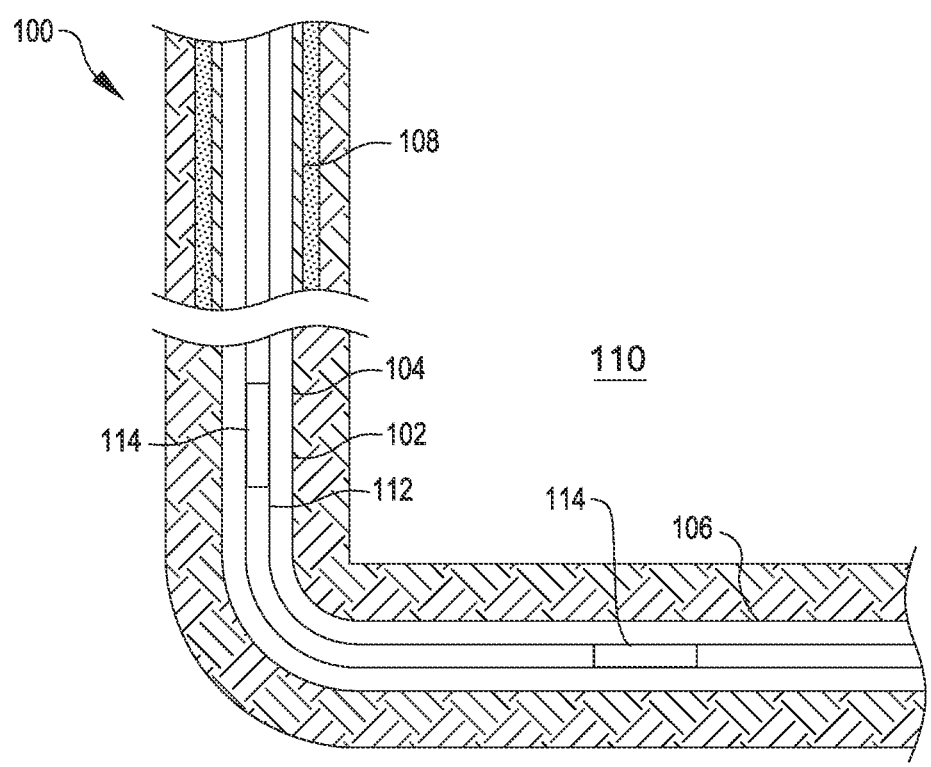

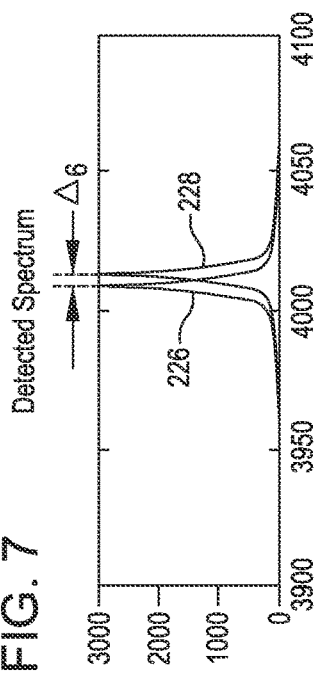
FIG. 7
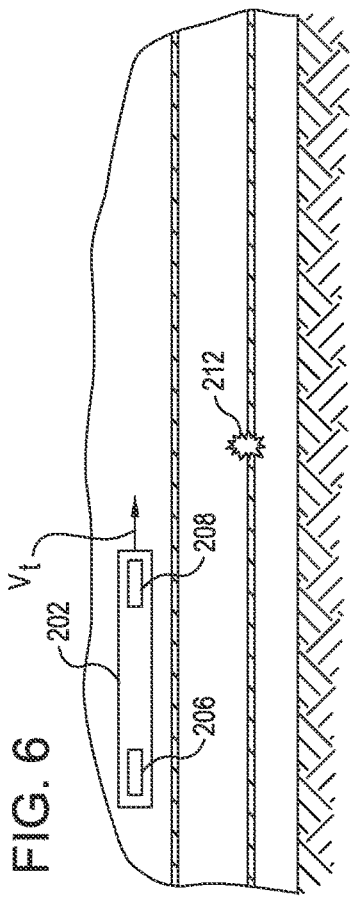
FIG. 6
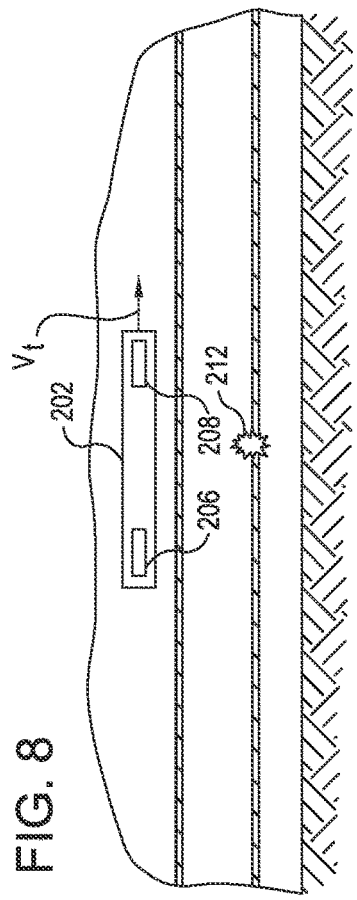
FIG. 9
FIG. 8
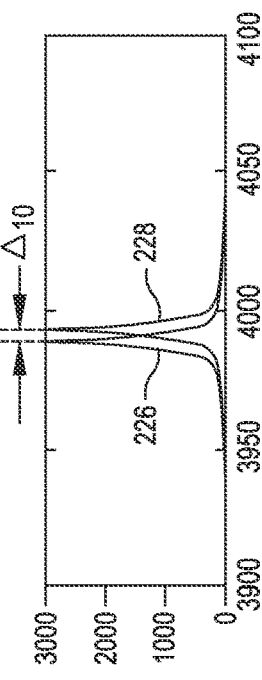
FIG. 11
FIG. 10

LEAK DETECTION VIA DOPPLER SHIFT DIFFERENCES IN MOVING HYDROPHONES

CROSS-REFERENCE TO RELATED APPLICATION

This is a U.S. national phase under 35 U.S.C. 371 of International Patent Application No. PCT/US2015/021669, titled "Leak Detection Via Doppler Shift Differences in Moving Hydrophones" and filed Mar. 20, 2015, the entirety of which is incorporated herein by reference.

TECHNICAL FIELD

The present disclosure relates generally to devices for use in a wellbore in a subterranean formation and, more particularly (although not necessarily exclusively), to techniques of detecting leaks in wellbore equipment using Doppler shift differences in moving hydrophones.

BACKGROUND

Various devices can be placed in a well traversing a hydrocarbon bearing subterranean formation. During any stage of operation of a well, one or more leaks may develop in fluid conduits (such as a tubing string or casing string) or other well equipment and negatively affect operation of the well. For example, a leak may permit passage of material into equipment that may cause damage. As another example, a leak may permit fluid to escape from a fluid conduit, which may result in problems such as increased expenses to replace the leaking fluid, loss of control of pressurized equipment, or liability from introducing excessive amounts of the fluid into the environment. Leaks may be difficult, time-intensive, and costly to detect or locate.

BRIEF DESCRIPTION OF THE DRAWINGS

FIG. 1 is a schematic illustration of a well system having a leak-detecting mobile hydrophone array according to some aspects of the present disclosure.

FIG. 6 is a schematic illustration of the mobile hydrophone array of FIG. 2 at a position before passing a leak according to some aspects of the present disclosure.

FIG. 7 is a graph showing an illustrative frequency spectrum of frequencies detected by hydrophones at the position shown in FIG. 6 according to some aspects of the present disclosure.

FIG. 8 is a schematic illustration of the mobile hydrophone array of FIG. 2 at a position while passing a leak according to some aspects of the present disclosure.

FIG. 9 is a graph showing an illustrative frequency spectrum of frequencies detected by hydrophones at the position shown in FIG. 8 according to some aspects of the present disclosure.

FIG. 10 is a schematic illustration of the mobile hydrophone array of FIG. 2 at a position after passing a leak according to some aspects of the present disclosure.

FIG. 11 is a graph showing an illustrative frequency spectrum of frequencies detected by hydrophones at the position shown in FIG. 10 according to some aspects of the present disclosure.

DETAILED DESCRIPTION

Figure 3:
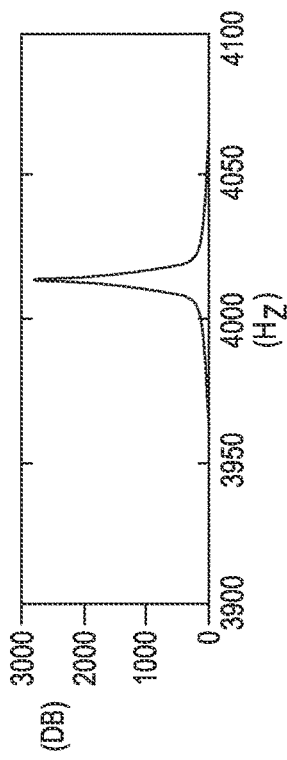
FIG. 3 is a graph showing an illustrative frequency spectrum of frequencies detected by the first hydrophone of FIG. 2 according to some aspects of the present disclosure.

Certain aspects and examples of the present disclosure are directed to techniques of detecting leaks in wellbore equipment using Doppler shift differences in moving hydrophones. A leak-detecting assembly can include an array of hydrophones. The array can be moved within a hydrocarbon well with a conveyance. A variation in the Doppler shift caused by a stationary acoustic source (such as a leak) while the array moves towards and away from that source can be determined based on information from the array of hydrophones. The assembly can be associated with a passive system that captures acoustic signals directly from the source or leak and estimates a location of the source or leak based on measurement of Doppler shift in each receiver.

In an illustrative example, a tool having hydrophones travels through a well, such as inside a production tube. A leak (such as in the production tube, the casing, the formation, or some combination thereof) generates an acoustic signal that can be detected by the hydrophones. Due to the movement of the tool relative to the leak, the hydrophones experience the Doppler Effect. As the hydrophones approach the leak, the Doppler frequency shifts are positive. As the tool moves across the location of the leak, a hydrophone on a first side of the leak moves toward the leak while a hydrophone on a second side of the leak moves away from the leak. Thus, the hydrophone on the first side experiences a positive Doppler shift, while the hydrophone on the second side experiences a negative Doppler shift. After passing the leak, the hydrophones then detect negative Doppler shifts. The change in Doppler shifts in the whole process can be used to detect and localize the leak. For example, the Doppler shifts measured by the hydrophones can be compared, and the area where the difference in those Doppler shifts is largest can be identified as the location of the leak.

These illustrative examples are given to introduce the reader to the general subject matter discussed here and are not intended to limit the scope of the disclosed concepts. The following describes various additional aspects and examples with reference to the drawings in which like numerals indicate like elements, and directional descriptions are used to describe the illustrative aspects. The following uses directional descriptions such as "upper," "lower," "left," "right," "uphole," "downhole," etc. in relation to the illustrative aspects as they are depicted in the figures, the left direction being toward the left of the corresponding figure and the right direction being toward the right of the corresponding figure, the uphole direction being toward the surface of the well and the downhole direction being toward the toe of the well. Like the illustrative aspects, the numerals and directional descriptions included in the following should not be used to limit the present disclosure.

FIG. 1 schematically depicts an example of a well system 100 having a leak-detecting mobile hydrophone array 114. The well system 100 includes a bore that is a wellbore 102 extending through various earth strata. The wellbore 102 has a substantially vertical section 104 and a substantially horizontal section 106. The substantially vertical section 104 and the substantially horizontal section 106 can include a casing string 108 cemented at an upper portion of the substantially vertical section 104. The substantially horizontal section 106 extends through a hydrocarbon bearing subterranean formation 110.

A tubing string 112 within the wellbore 102 can extend from the surface to the subterranean formation 110. The tubing string can include one or more joints that are tubing sections of the tubing string 112. The tubing string 112 can provide a conduit for formation fluids, such as production fluids produced from the subterranean formation 110, to travel from the substantially horizontal section 106 to the surface. Pressure from a bore in a subterranean formation 110 can cause formation fluids, including production fluids such as gas or petroleum, to flow to the surface from a lower portion of the well.

The well system 100 can also include a leak-detecting mobile hydrophone array 114. The leak-detecting mobile hydrophone array 114 may move through the wellbore 102 and collect sound data that can be used to determine locations of leaks based on differences in Doppler effects upon hydrophones of the hydrophone array 114.

Although FIG. 1 depicts a first hydrophone array 114 in the substantially vertical section 104 and a second hydrophone array in the substantially horizontal section 106, any number of hydrophone arrays 114 (including one or more than two) can be located, additionally or alternatively, in any portion of the well system 100. In some aspects, a hydrophone array 114 can be disposed in simpler wellbores, such as wellbores having only a substantially vertical section. The hydrophone array 114 can be disposed in openhole environments, as depicted in the substantially horizontal section 106 in FIG. 1, or in cased wells.

Figure 14:
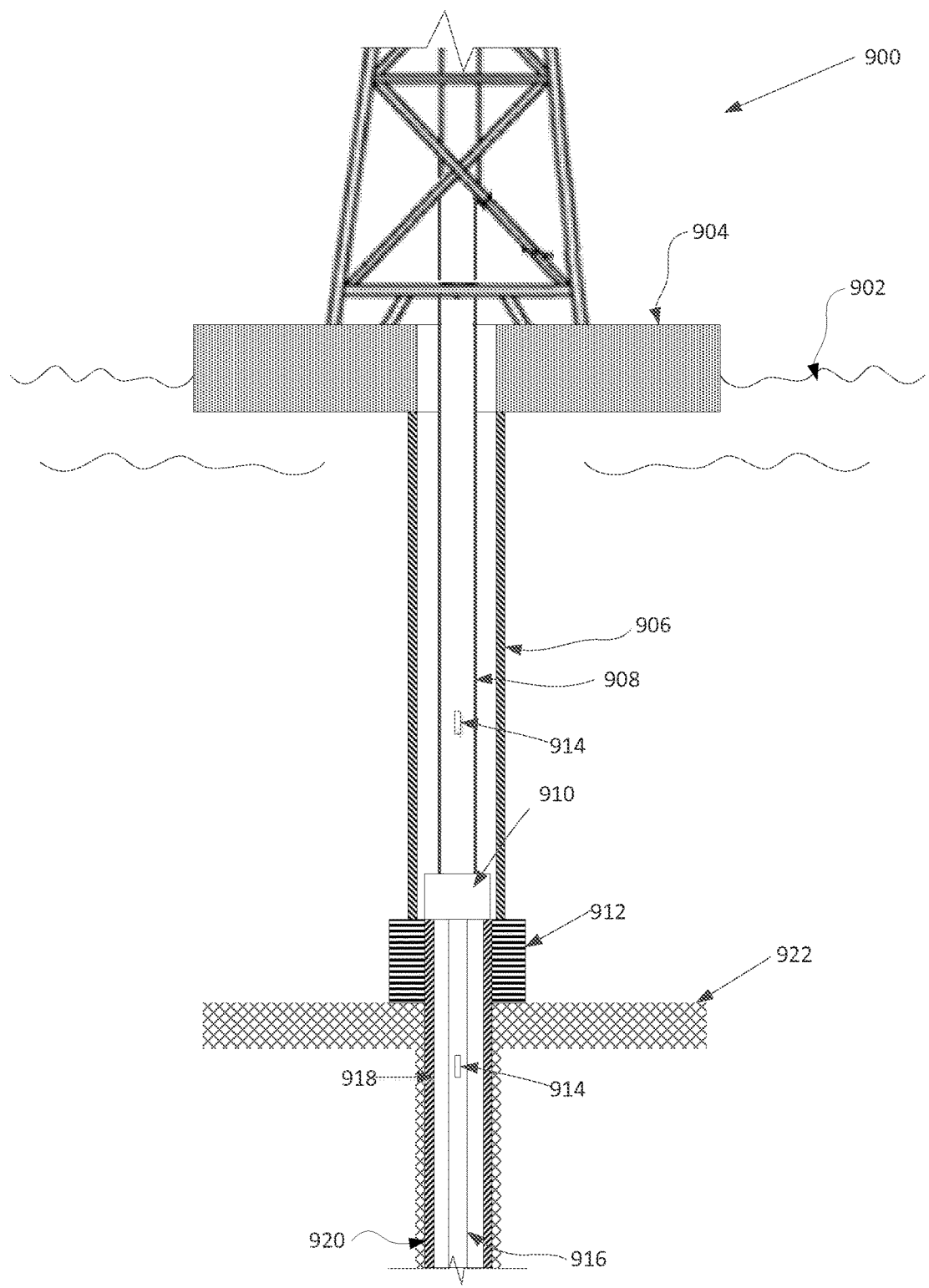
FIG. 14 is a cross-sectional view of an example of a subsea or offshore well system having a leak-detecting mobile hydrophone array according to some aspects of the present disclosure.

Mobile hydrophone arrays can additionally or alternatively be used in other well systems. For example, FIG. 14 is a cross-sectional view of an example of a subsea or offshore well system 900 having a leak-detecting mobile hydrophone array 914. The well system 900 includes a platform 904. In some examples, the platform 904 can be a floating rig or a vessel positioned at the sea surface 902. A riser 906 can extend from the platform 904 to a subsea tree 912. The subsea tree 912 can be positioned at the sea floor 922. The riser 906 can include a tubular 908 (e.g., a landing string). The tubular 908 can extend from the platform 904 to the subsea tree 912. In some examples, a well operator can use the tubular 908 to communicate fluid, power, well tools, and other well components between the sea surface 902 and the sea floor 922.

The subsea tree 912 can include ports, valves, and flow lines for controlling fluid flow through the well system 900. In some examples, the subsea tree 912 can control the flow of fluid through a tubular 916 (e.g., a production tube) positioned in a wellbore 920 (e.g., below the sea floor 922). The tubular 916 can be positioned in the wellbore 920 for extracting hydrocarbons from the wellbore 920. In other examples, the subsea tree 912 can control the flow of fluid from the tubular 916 to other well tools in the well system 900. For example, the subsea tree 912 can control the flow of fluid from the tubular 916 to other well tools positioned on the sea floor 922. In some examples, the subsea tree 912 can include or otherwise be coupled to a subsea control system 910 for controlling the subsea tree 912.

The wellbore 920 can include a casing string 918. The casing string 918 can be positioned in the wellbore 920 for preventing the walls of the wellbore 920 from collapsing.

The well system 900 can also include a leak-detecting mobile hydrophone array 914. The leak-detecting mobile hydrophone array 914 may move through the well system 900 and collect sound data that can be used to determine locations of leaks based on differences in Doppler effects upon hydrophones of the hydrophone array 914. As one example, the mobile hydrophone array 914 may detect leaks in the riser 906 or the tubular 908 (e.g. when the hydrophone array 914 is located within the tubular 908, such as at a first, upper position shown in FIG. 14). As another example, the mobile hydrophone array 914 may detect leaks in the tubular 916 or the casing string 918 (e.g. when the hydrophone array 914 is located within the tubular 916, such as at a second, lower position shown in FIG. 14).

Figure 15:
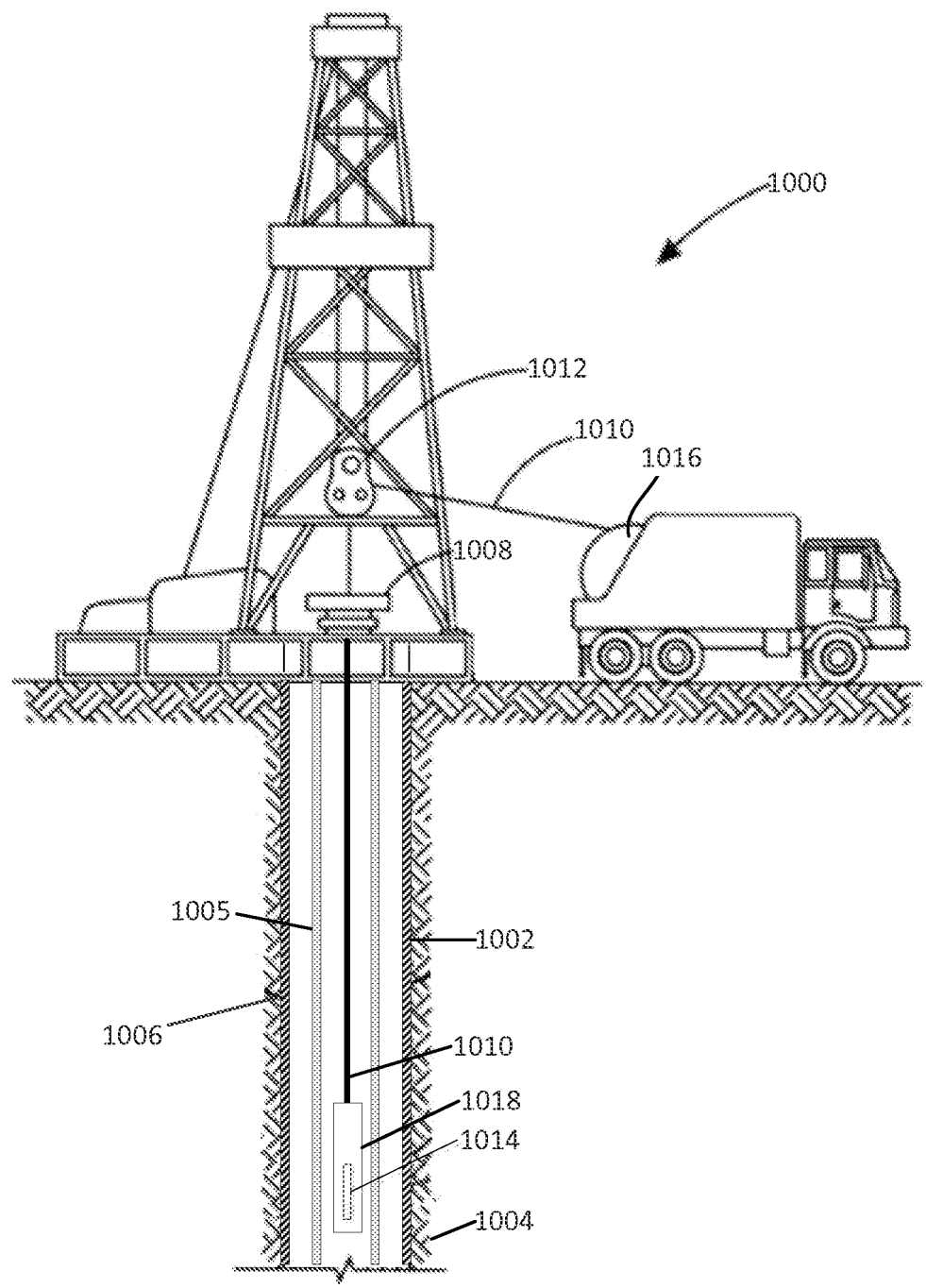
FIG. 15 is a cross-sectional view of an example of another well system having a mobile hydrophone array according to some aspects of the present disclosure.

FIG. 15 is a cross-sectional view of an example of another well system 1000 having a mobile hydrophone array 1014. The well system 1000 includes a wellbore 1002 extending through various earth strata. The wellbore 1002 extends through a hydrocarbon bearing subterranean formation 1004. A tubular 1005 (e.g., a production tube) can extend from the surface 1008 to the subterranean formation 1004. The tubular 1005 can provide a conduit through which formation fluids, such as production fluids produced from the subterranean formation, can travel form the wellbore 1002 to the surface 1008. In some examples, a casing string 1006 can extend from the surface 1008 to the subterranean formation 1004. The casing string 1006 can be coupled to the walls of the wellbore 1002 via cement. For example, a cement sheath can be positioned or formed between the casing string 1006 and the walls of the wellbore 1002 for coupling the casing string 1006 to the wellbore 1002. In some examples, the casing string 1006 can prevent the walls of the wellbore 1002 from collapsing.

The well system 1000 can also include at least one well tool 1018 (e.g., a formation-testing tool). The well tool 1018 can be coupled to a wireline 1010, slickline, or coiled tube (e.g., wired or unwired) that can be deployed into the wellbore 1002. The wireline 1010, slickline, or coiled tube can be guided into the wellbore 1002 using, for example, a guide 1012 or winch. In some examples, the wireline 1010, slickline, or coiled tube can be wound around a reel 1016. In some aspects, the well tool 1018 can include a mobile hydrophone array 914 that can move through the well system 900 and collect sound data that can be used to determine locations of acoustic sources (e.g., leaks) based on differences in Doppler effects upon hydrophones of the hydrophone array 914.

Figure 16:
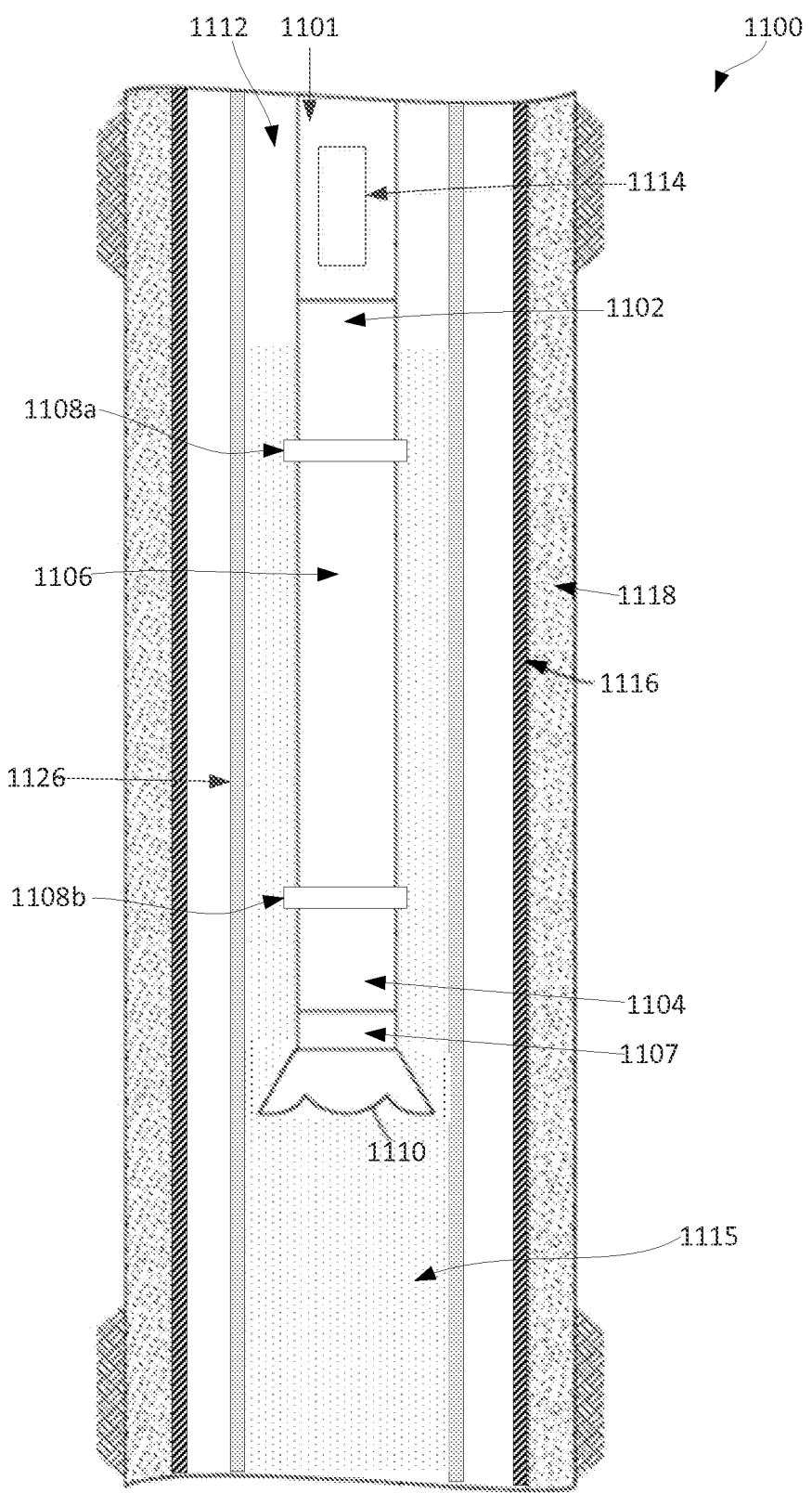
FIG. 16 is a cross-sectional side view of an example of a part of another well system having a mobile hydrophone array according to some aspects of the present disclosure.

FIG. 16 is a cross-sectional side view of an example of a part of another well system 1100 having a mobile hydrophone array 1114. In this example, the well system 1100 includes a wellbore. The wellbore can include a casing string 1116. A cement sheath 1118 couples the casing string 1116 to a wall of the wellbore. In some examples, the wellbore can include a fluid 1115 (e.g., mud). The fluid 1115 can flow in an annulus 1112 of a tubular 1126 (e.g., a production tube).

A well tool 1101 (e.g., a logging-while-drilling tool) can be positioned in the wellbore. The well tool 1101 can include various subsystems 1102, 1104, 1106, 1107. For example, the well tool 1101 can include a subsystem 1102 that includes a communication subsystem. The well tool 1101 can also include a subsystem 1104 that includes a saver subsystem or a rotary steerable system. A tubular section or an intermediate subsystem 1106 (e.g., a mud motor or measuring-while-drilling module) can be positioned between the other subsystems 1102, 1104. In some examples, the well tool 1101 can include a drill bit 1110 for drilling the wellbore. The drill bit 1110 can be coupled to another tubular section or intermediate subsystem 1107 (e.g., a measuring-while-drilling module or a rotary steerable system). In some aspects, the well tool 1101 can also include tubular joints 1108*a*, 1108*b*. In some aspects, the well tool 1101 includes a mobile hydrophone array 1114 that can move through the well system 900 and collect sound data that can be used to determine locations of acoustic sources (e.g., leaks) based on differences in Doppler effects upon hydrophones of the hydrophone array 1114.

Figure 2:
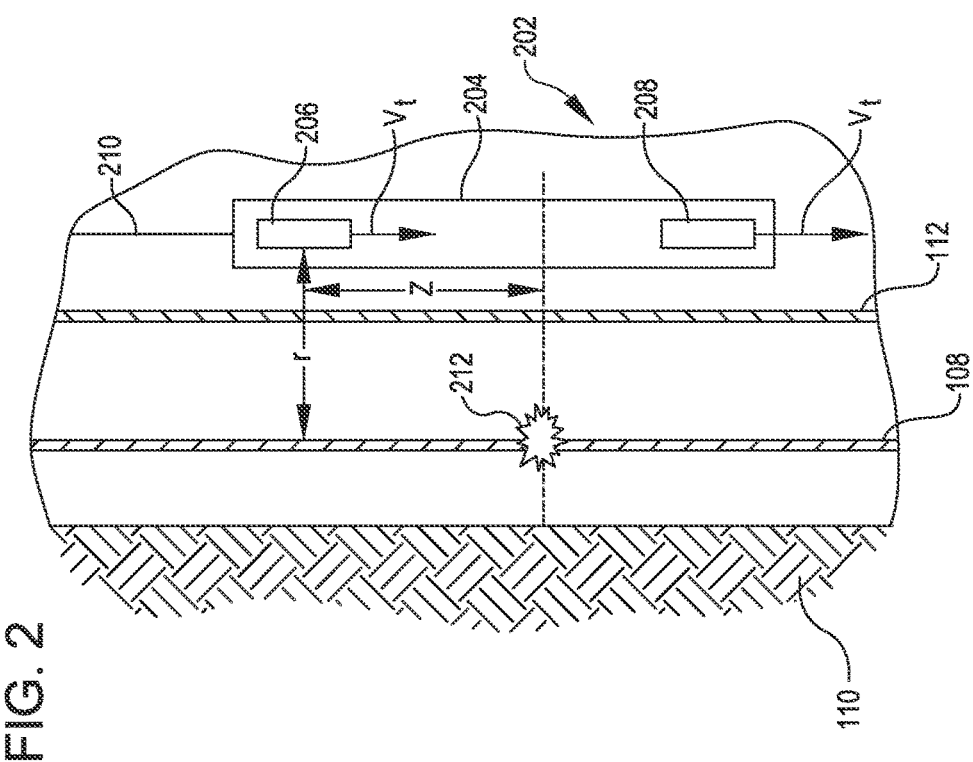
FIG. 2 is a schematic illustration of an example of a mobile hydrophone array according to some aspects of the present disclosure.

Various types of hydrophone arrays can be used in well systems such as the well systems 100, 900, 1000, and 1100 depicted in FIGS. 1, 13, 14, 15, and 16. FIG. 2 shows an example of a mobile hydrophone array 202. The hydrophone array 202 can include a body 204 and two or more hydrophones 206, 208. The hydrophones 206, 208 can include any suitable structure for converting acoustic vibrations traveling through a liquid (or an at least partially liquid) medium into an electrical signal. The hydrophones 206, 208 can be coupled with the body 204 and disposed a fixed, known distance apart from one another.

The hydrophone array 202 may be coupled with a conveyance 210. The conveyance 210 can be any structure or mechanism capable of moving the hydrophone array 202 within a well system. As non-limiting examples, the conveyance 210 may be a wireline, a slickline, a coiled tube, a portion of a drillstring, or an independent propulsion system (e.g., with a motor or other device for driving wheels or a propeller). In some aspects, the conveyance 210 can control motion of the hydrophone array 202, facilitate communications of the hydrophone array 202, or both. As an illustrative example, a wire-type conveyance 210 may be fed into a wellbore 102 at a particular rate to control a speed of the hydrophone array 202 and may carry communication signals between the hydrophone array 202 and an operator interface at the surface. In some aspects, other devices additionally or alternatively can provide or control motion or communication of the hydrophone array 202. For example, the hydrophone array 202 may include a wireless communication device or an independent propulsion system (not shown in FIG. 2) to move or guide the hydrophone array 202 relative to objects in the wellbore 102.

The hydrophone array 202 can move relative to objects in the wellbore 102 in order to detect leaks in the objects. FIG. 2 shows an illustrative example of the hydrophone array 202 moving relative to a formation 110, a joint of casing 108, and a joint of tubing 112 to detect a leak 212 in the casing 108. The leak 212 can generate an acoustic signal that can be detected by the hydrophones 206, 208. In some aspects, the hydrophones 206, 208 can detect the acoustic signal of the leak 212 when intervening structures are located between the leak 212 and the hydrophones 206, 208. For example, an acoustic signal of the leak 212 may travel from the casing 108, through the intervening structure of the tubing 112, and to the hydrophones 206, 208.

The acoustic signal generated by or emitted by the leak 212 can include an emitted set of frequencies. Movement of the hydrophone array 202 can cause an associated hydrophone 206 to detect a set of frequencies that differ from the emitted set of frequencies by a Doppler shift. This Doppler shift can provide a basis for determining a location of the leak 212 through techniques described in greater detail below.

Analytically, the Doppler shift $\Delta f_D$ that a moving hydrophone 206 may encounter for a sinusoidal acoustic signal at a particular frequency can be computed by:

$$\Delta f_D = \left( \pm \frac{v_t}{v_m} \sqrt{1 + \frac{r^2}{z^2}} \right)$$

where $v_t$ is a speed at which the tool (e.g., the hydrophone 206) is moving, $v_m$ is the speed of sound in the medium (e.g., the wellbore fluid) through which the tool is moving, and $z$ and $r$ are respectively the longitudinal distance and the range (e.g., as depicted in FIG. 2) between the sound source (e.g., the leak 212) and the tool. The "±" sign can correspond to the Doppler shift being positive or negative depending on whether the hydrophone 206 is moving toward or away the leak 212.

Figure 4:
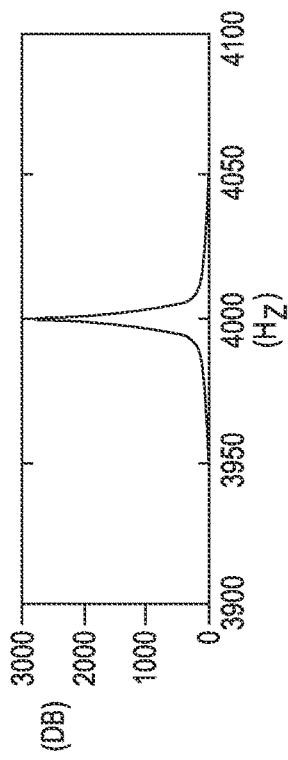
FIG. 4 is a graph showing an illustrative frequency spectrum of frequencies emitted by the leak of FIG. 2 according to some aspects of the present disclosure.
Figure 5:
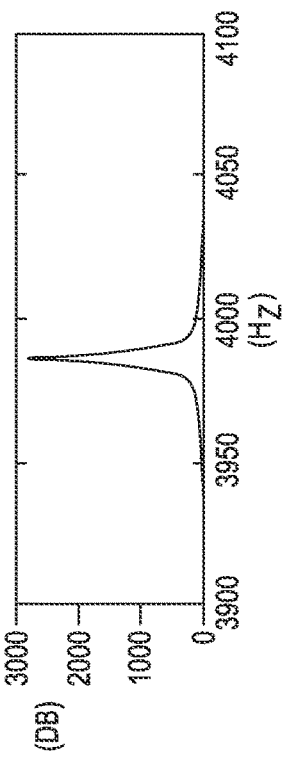
FIG. 5 is a graph showing an illustrative frequency spectrum of frequencies detected by the second hydrophone of FIG. 2 according to some aspects of the present disclosure.

An illustrative example of such Doppler shifts is graphically represented in FIGS. 3-5, which respectively show illustrative frequency spectrums of sets of frequencies associated with elements depicted in FIG. 2. Specifically, FIG. 3 shows a set of frequencies detected by a first hydrophone 206 that is moving toward the leak 212, FIG. 4 shows a set of frequencies emitted by the leak 212, and FIG. 5 shows a set of frequencies detected by a second hydrophone 208 that is moving away from the leak 212. Each of FIGS. 3-5 is located on the page at a position that is directly to the right of the corresponding element in FIG. 2.

In this illustrative example shown in FIGS. 2-5, the body 204 of the hydrophone array 202 is adjacent to the leak 212 so that the first hydrophone 206 and the second hydrophone 208 are spaced equidistantly on either side of the leak 212 as the hydrophone array 202 passes by the leak 212. The leak 212 emits a set of frequencies that have a greatest decibel level clustered around the 4 KHz mark, as shown in FIG. 4. The first hydrophone 206, which is moving toward the leak 212, detects each successive wave crest of the leak's acoustic signal from a position closer to leak 212 than the previous wave crest, thus reducing the time between the detection of successive wave crests and causing an increase in detected frequency. As a result, the first hydrophone 206 (moving toward the leak) detects the set of frequencies as clustered around the 4.03 KHz mark, e.g., with a Doppler shift of +30 Hz. In contrast, the second hydrophone 208, which is moving away from the leak 212, detects each successive wave crest of the leak's acoustic signal from a position farther from the leak 212 than the previous wave crest, thus increasing the time between the detection of successive wave crests and causing a decrease in detected frequency. As a result, the second hydrophone 208 (moving away from the leak) detects the set of frequencies as clustered around the 3.97 KHz mark, e.g., with a Doppler shift of −30 Hz.

Such differences in Doppler shift between hydrophones 206, 208 in a hydrophone array 202 may be utilized to determine a location of a leak 212. For example, the difference in Doppler shifts can be expected to be the largest at a location where the hydrophone array 202 is positioned adjacent to the leak 212. In some aspects, frequencies detected by the hydrophones 206, 208 can be analyzed (e.g., compared to a known frequency emitted by the leak 212) to directly calculate the Doppler shifts experienced by the hydrophones 206, 208 and determine a location of maximum difference. In additional or alternative aspects, the frequencies detected by the hydrophones 206, 208 can be compared to one another (e.g., regardless of whether a frequency emitted by the leak 212 is known) to determine a location of a maximum difference in Doppler shifts. For example, a location at which a difference in detected frequencies is at a maximum may correspond to the location at which the difference in Doppler shifts is greatest, as discussed in greater detail with respect to FIGS. 6-12.

FIGS. 6-12 illustrate an example of comparing frequencies detected by a hydrophone array 202 to determine a location of a leak 212. Specifically, FIG. 6 shows the hydrophone array 202 before passing a leak 212, and FIG. 7 shows a corresponding illustrative set of frequencies detected by hydrophones 206, 208 at the position shown in FIG. 6. At the position shown in FIG. 6, the first hydrophone 206 is moving toward the leak 212 and detects a first frequency spectrum 226 depicted in FIG. 7. The second hydrophone 208—also moving toward the leak 212, yet experiencing a slightly greater Doppler shift than the first hydrophone 206 by merit of being positioned slightly closer to the leak 212—detects a second frequency spectrum 228 that is slightly higher than the first frequency spectrum 226, e.g., offset by a first difference $\Delta_6$ to the right in FIG. 7.

FIG. 8 shows the hydrophone array 202 while passing a leak 212, and FIG. 9 shows a corresponding illustrative set of frequencies detected by hydrophones 206, 208 at the position shown in FIG. 8. At the position shown in FIG. 8, the first hydrophone 206 is still moving toward the leak 212, yet detects a first frequency spectrum 226 (depicted in FIG. 9) that is higher than the first frequency spectrum 226 depicted in FIG. 7 (e.g., slightly higher because the Doppler shift has increased as the first hydrophone 206 has moved from the position in FIG. 6 to the position in FIG. 8 that is closer to the leak 212). Meanwhile, the second hydrophone 208 has moved from a first side of the leak 212 (FIG. 6) to an opposite side of the leak 212 (FIG. 8). Thus, the second hydrophone 208 has switched from experiencing a positive Doppler shift (e.g., from moving toward the leak 212) to experiencing a negative Doppler shift (e.g., from moving away from the leak 212). As a result, the second hydrophone 208 detects a substantially lower second frequency spectrum 228 (depicted in FIG. 9) than the second frequency spectrum 228 depicted in FIG. 7. Hence, when the first hydrophone 206 and the second hydrophone 208 are on opposite sides of the leak 212 (as shown in FIG. 8), there is a significant corresponding difference $\Delta_8$ between the first frequency spectrum 226 and the second frequency spectrum 228 (as shown in FIG. 9).

FIG. 10 shows the hydrophone array 202 while passing a leak 212, and FIG. 11 shows a corresponding illustrative set of frequencies detected by hydrophones 206, 208 at the position shown in FIG. 10. At the position shown in FIG. 10, the first hydrophone 206 has moved from the first side of the leak 212 (FIG. 8) to the opposite side of the leak 212 (FIG. 10), resulting in a switch from a positive Doppler shift to a negative Doppler shift and causing the first hydrophone 206 to detect a substantially lower first frequency spectrum 226 (depicted in FIG. 11) than the first frequency spectrum 226 depicted in FIG. 10. Meanwhile, the second hydrophone 208 is also moving away from the leak 212. As such, the first hydrophone 206 and second hydrophone 208 in the positions shown in FIG. 10 detect a second frequency spectrum 228 and a first frequency spectrum 226 offset by a small difference $\Delta_{10}$ (FIG. 11).

Figure 12:
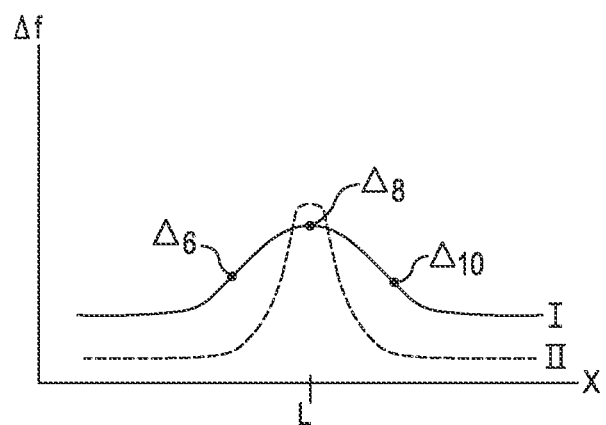
FIG. 12 is a graph showing illustrative differences in frequencies detected by the mobile hydrophone array of FIG. 2 relative to a position of the mobile hydrophone array within a wellbore according to some aspects of the present disclosure.

FIG. 12 is a graph showing illustrative differences in frequencies $\Delta f$ detected by the hydrophone array 202 relative to a position X of the hydrophone array 202 within a wellbore 102. For example, trend line I may correspond to frequencies and location from the illustrative example of FIGS. 6-11. Trend line I illustrates that a difference $\Delta f$ in frequencies detected by the hydrophone array 202 can increase while approaching a location L corresponding to a location of the leak 212 (e.g., moving from $\Delta_6$ toward $\Delta_8$), reach a maximum (e.g., $\Delta_8$) at the location L of the leak 212, and decrease while moving away from the location L of the leak 212 (e.g., moving from $\Delta_8$ toward $\Delta_{10}$). Accordingly, the location L of the leak 212 can be determined by determining the position X at which the difference in frequencies $\Delta f$ reaches a maximum.

Although discussion herein has primarily focused on determining a leak location based on differences in frequencies detected by one pair of hydrophones 206, 208 being translated through a wellbore 102, other arrangements are possible. In some aspects, additional data about differences in detected frequencies can be used to additionally or alternatively provide information about a location L of a leak. For example, the trend line II in FIG. 12 may correspond to an additional source of data that can increase a confidence about the determined location L of a leak.

In one illustrative example, trend line II can correspond to data about differences in detected frequencies obtained from rotating hydrophones 206, 208 in addition or as an alternative to translating the hydrophones 206, 208 through the wellbore 102. In some aspects, the translating motion of the hydrophones 206, 208 can yield information for determining a longitudinal position of a leak within a wellbore 102 (e.g., a position along a length of the wellbore 102) and the rotating motion of the hydrophones 206, 208 can yield information for determining an angular position of the leak within the wellbore 102 (e.g., a position along a perimeter of a cross-section the wellbore 102). In some aspects, the rotating motion of the hydrophones 206, 208 can provide additional differences in detected frequencies that may facilitate identification of a location L of a leak when translating motion may be too slow to yield an appreciable difference in Doppler shifts experienced by the hydrophones 206, 208.

In another illustrative example, the trend line II can correspond to data about differences in detected frequencies obtained from a different pair of hydrophones. For example, the hydrophone array 202 may include a third hydrophone between the first hydrophone 206 and the second hydrophone 208, and the trend line II may correspond to differences between frequencies detected by the third hydrophone and the second hydrophone 208. Increasing a number of hydrophones may provide a greater number of detected frequency comparisons that can be made, which may improve a resolution or confidence of data obtained by the hydrophone array 202.

In some aspects, multiple maximum differences in detected frequencies may be determined to identify the location of multiple leaks. For example, a threshold relative to a trend line may be utilized such that any maximum difference of detected frequencies that crosses the threshold is associated with a distinct leak. The threshold may be determined based on characteristics of the hydrophone array 202, the wellbore 102, or other factors.

Figure 13:
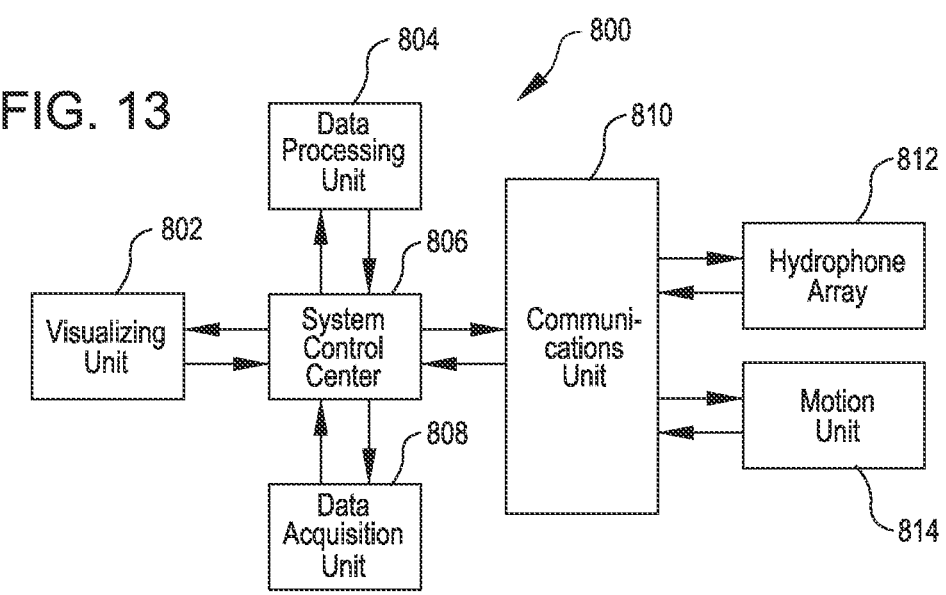
FIG. 13 is a block diagram depicting an example of a system for detecting a location of a leak based on Doppler shift differences of hydrophones of a moving array according to some aspects of the present disclosure.

FIG. 13 is a block diagram depicting an example of a system 800 for detecting a location of a leak based on Doppler shift differences of hydrophones of a moving array according to one aspect. The system 800 can include a system control center 806, a visualizing unit 802, a data processing unit 804, a data acquisition unit 808, a communications unit 810, a hydrophone array 812, and a motion unit 814. The system 800 can include more or fewer than all of these listed components.

The system control center 806 can control the operation of the system 800 for detecting a location of a leak in a tubular of a wellbore formation. The system control center 806 can include a processor device and a non-transitory computer-readable medium on which machine-readable instructions can be stored. Examples of non-transitory computer-readable medium include random access memory (RAM) and read-only memory (ROM). The processor device can execute the instructions to perform various actions, some of which are described herein. The actions can include, for example, communicating with other components of the system 800.

The system control center 806 can communicate via the communications unit 810. For example, the system control center 806 can send commands to the motion unit 814 via the communications unit 810. The communications unit 810 can also communicate information about components to the system control center 806. For example, the communications unit 810 can communicate a status of the hydrophone array 812, such as whether or not all of the hydrophones in the hydrophone array 812 are operating correctly, to the system control center 806. In some aspects, the communications unit 810 can communicate information in a contemporaneous manner, such as transmitting information from the hydrophone array 812 as the information is generated. In additional or alternative aspects, the communications unit 810 can communicate information in an asynchronous manner, such as transmitting information recorded by the hydrophone array 812 from a storage medium after the hydrophone array 812 is removed from the well system.

The system control center 806 can receive information via the communications unit 810 from the hydrophone array 812. Hydrophones of the hydrophone array 812 can detect variations in sound wave frequency, such as may be affected by the Doppler Effect while the hydrophone array 812 is moving. The system control center 806 can also communicate via the communications unit 810 with the hydrophone array 812. For example, the system control center 806 can send instructions for hydrophones of the hydrophone array 812 to initiate or terminate sound detection.

The system control center 806 can also communicate via the communications unit 810 with the motion unit 814. For example, the system control center 806 can send instructions to initiate or terminate motion of the hydrophone array 812 provided by the motion unit 814. The motion unit 814 can provide any suitable motion for the hydrophone array 812, including, but not limited to, translation through or rotation within a tubular positioned in a well system. The motion unit 814 can provide motion via any suitable mechanism, including, but not limited to, a winch and cable, a wiper plug, and a propulsion system. The motion unit 814 can also communicate with the system control center 806 via the communications unit 810, such as regarding a speed or position of the hydrophone array 812 resulting from the motion provided by the motion unit 814.

The system control center 806 can also be in communication with a data acquisition unit 808. The data acquisition unit 808 can acquire data from any of the units depicted in FIG. 8 or any other sensors that are included in the system 800.

The system control center 806 can also be in communication with a data processing unit 804. The data processing unit 804 can include a processor device and a non-transitory computer-readable medium on which machine-readable instructions can be stored. The processor device can execute the instructions to perform various actions, some of which are described herein. As a non-limiting example, the data processing unit 804 can process data acquired by the data acquisition unit 808. For example, the data processing unit 804 can provide information about an existence or location of a leak based on acquired data about changes in frequencies detected by the hydrophone array 812 and acquired data about locations or times corresponding to the changes.

The system control center 806 can also be in communication with a visualizing unit 802. The visualizing unit 802 can provide an interface for an operator of the system to check system operation and input intervening commands if necessary. Such intervening commands can override default or preset conditions earlier entered or used by the system control center 806. In some aspects, the visualizing unit 802 can provide an interface for a system operator to view the location of leaks detected by the system 800.

Visualizing unit 802, data processing unit 804, system control center 806, data acquisition unit 808, and communications unit 810 can be positioned or located at the surface of a well system 100. Alternatively, one or multiple of these components can also be located in a tool positioned within a wellbore rather than at the surface. Accordingly, functions performed by such components (such as information processing) may be performed at the surface in real-time (e.g., based on data transferred on a telemetry line from components in the well) or when a well-traversing tool bearing any of the components is off-line (e.g. removed from the well).

In some aspects, downhole tool, a system, or a method is provided according to one or more of the following examples or according to some combination of the elements thereof. In some aspects, a tool or a system described in one or more of these examples can be utilized to perform a method described in one of the other examples.

Example #1

Provided can be a method comprising: (A) receiving, by a first hydrophone of a tool moving relative to a stationary acoustic source disposed in a wellbore, a first acoustic signal generated by the stationary acoustic source; (B) receiving, by a second hydrophone of the tool moving relative to the stationary acoustic source, second acoustic signals generated by the stationary acoustic source; and (C) determining a location of the stationary acoustic source in the wellbore based on differences in Doppler shifts between the first acoustic signals and the second acoustic signals.

Example #2

Provided can be the method of Example #1, wherein the stationary acoustic source is a leak.

Example #3

Provided can be the method of Example #1 (or any of Examples #1-2), further comprising: (D) receiving, by a third hydrophone of the tool moved relative to the stationary acoustic source, third acoustic signals generated by the stationary acoustic source; and (E) confirming the location of the stationary acoustic source in the wellbore based on differences in Doppler shifts between the third acoustic signals and the first acoustic signals.

Example #4

Provided can be the method of Example #1 (or any of Examples #1-3), wherein determining a location of the stationary acoustic source in the wellbore based on differences in Doppler shifts between the first acoustic signals and the second acoustic signals comprises: (i) determining a location of the tool corresponding to a maximum difference in Doppler shifts between the first acoustic signals and the second acoustic signals; and (ii) associating a location of the stationary acoustic source with the determined location of the tool.

Example #5

Provided can be the method of Example #1 (or any of Examples #1-4), wherein the tool moving relative to the stationary acoustic source disposed in the wellbore comprises the tool translating relative to the stationary acoustic source disposed in the wellbore.

Example #6

Provided can be the method of Example #1 (or any of Examples #1-5), wherein the tool moving relative to the stationary acoustic source disposed in the wellbore comprises the tool translating and rotating relative to the stationary acoustic source disposed in the wellbore.

Example #7

Provided can be the method of Example #1 (or any of Examples #1-6), wherein receiving, by a first hydrophone of a tool moving relative to a stationary acoustic source disposed in a wellbore, first acoustic signals generated by the stationary acoustic source comprises receiving first acoustic signals during a timeframe in which the tool is moving relative to the stationary acoustic source.

Example #8

Provided can be the method of Example #1 (or any of Examples #1-7), wherein receiving, by a first hydrophone of a tool moving relative to a stationary acoustic source disposed in a wellbore, first acoustic signals generated by the stationary acoustic source comprises receiving, after a timeframe in which the tool is moving relative to the stationary acoustic source, first acoustic signals that are obtained by the first hydrophone and stored during the timeframe in which the tool is moving relative to the stationary acoustic source.

Example #9

Provided can be a computer program product for locating a stationary acoustic source in a wellbore, the computer program product (which may incorporate features of any of Examples #1-8) comprising a computer readable storage medium readable by a processing device and storing instructions for execution by the processing device for performing a method comprising: (A) receiving, by a first hydrophone of a tool moving relative to a stationary acoustic source disposed in a wellbore, first acoustic signals generated by the stationary acoustic source; (B) receiving, by a second hydrophone of the tool moving relative to the stationary acoustic source, second acoustic signals generated by the stationary acoustic source; and (C) determining a location of the stationary acoustic source in the wellbore based on differences in Doppler shifts between the first acoustic signals and the second acoustic signals.

Example #10

Provided can be the computer program product of Example #9, wherein the method further comprises: (D) receiving, by a third hydrophone of the tool moving relative to the stationary acoustic source, third acoustic signals generated by the stationary acoustic source; and (E) confirming a location of the stationary acoustic source in the wellbore based on differences in Doppler shifts between the third acoustic signals and the first acoustic signals.

Example #11

Provided can be the computer program product of Example #9 (or any of Examples #9-10), wherein determining a location of the stationary acoustic source in the wellbore based on differences in Doppler shifts between the first acoustic signals and the second acoustic signals comprises: (i) determining a location of the tool corresponding to a maximum difference in Doppler shifts between the first acoustic signals and the second acoustic signals; and (ii) associating a location of the stationary acoustic source with the determined location of the tool.

Example #12

Provided can be the computer program product of Example #9 (or any of Examples #9-11), wherein the tool moving relative to the stationary acoustic source disposed in the wellbore comprises the tool translating relative to the stationary acoustic source disposed in the wellbore.

Example #13

Provided can be the computer program product of Example #9 (or any of Examples #9-12), the tool moving relative to the stationary acoustic source disposed in the wellbore comprises the tool translating and rotating relative to the stationary acoustic source disposed in the wellbore.

Example #14

Provided can be the computer program product of Example #9 (or any of Examples #9-13), wherein receiving, by a first hydrophone of a tool moving relative to a stationary acoustic source disposed in a wellbore, first acoustic signals generated by the stationary acoustic source comprises receiving first acoustic signals during a timeframe in which the tool is moving relative to the stationary acoustic source.

Example #15

Provided can be the computer program product of Example #9 (or any of Examples #9-14), wherein receiving, by a first hydrophone of a tool moving relative to a stationary acoustic source disposed in a wellbore, first acoustic signals generated by the stationary acoustic source comprises receiving, after a timeframe in which the tool is moving relative to the stationary acoustic source, first acoustic signals that are obtained by the first hydrophone and stored during the timeframe in which the tool is moving relative to the stationary acoustic source.

Example #16

Provided can be a downhole assembly (which may incorporate features of any of Examples #1-15), comprising: (A) a body; (B) a first hydrophone coupled with the body at a first position, the first hydrophone operable to receive an acoustic signal generated by a stationary acoustic source disposed in a wellbore and output first information; (C) a second hydrophone coupled with the body at a second position different from the first position, the second hydrophone operable to receive the acoustic signal generated by the stationary acoustic source and output second information; and (D) a communications unit communicatively coupled with the first hydrophone and the second hydrophone so as to communicate the first information and the second information for determining a location of the stationary acoustic source in the wellbore based on differences between Doppler shifts of the first information and the second information.

Example #17

Provided can be the downhole assembly of Example #15, further comprising a third hydrophone coupled with the body at a third position different from the first position and the second position, the third hydrophone operable to receive the acoustic signal generated by the stationary acoustic source and output third information; and wherein the communications unit is further communicatively coupled with the third hydrophone so as to communicate the third information for confirming a location of the stationary acoustic source in the wellbore based on differences between Doppler shifts of the third information and the first information.

Example #18

Provided can be the downhole assembly of Example #16 (or any of Examples #16-17), further comprising a motion unit coupled with the body so as to cause translation of the first hydrophone relative to the stationary acoustic source.

Example #19

Provided can be the downhole assembly of Example #16 (or any of Examples #16-19), further comprising a motion unit coupled with the body so as to cause translation and rotation of the first hydrophone relative to the stationary acoustic source.

Example #20

Provided can be the downhole assembly of Example #16 (or any of Examples #16-19), wherein the communications unit is communicatively coupled with the first hydrophone and the second hydrophone so as to communicate the first information and the second information during a timeframe in which the body is moving relative to the stationary acoustic source.

Example #21

Provided can be the downhole assembly of Example #16 (or any of Examples #16-20), wherein the communications unit is communicatively coupled with the first hydrophone and the second hydrophone so as to store the first information and the second information during a timeframe in which the body is moving relative to the stationary acoustic source and communicate the stored first information and second information after the timeframe in which the body is moving relative to the stationary acoustic source.

The foregoing description, including illustrated aspects and examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of this disclosure.

What is claimed is:

1. A method comprising:
receiving, by a first hydrophone of a tool moving relative to a stationary acoustic source disposed in a wellbore, first acoustic signals generated by the stationary acoustic source;
receiving, by a second hydrophone of the tool moving relative to the stationary acoustic source, second acoustic signals generated by the stationary acoustic source, wherein each of the first acoustic signals and the second acoustic signals comprises a set of frequencies;
comparing the set of frequencies from the first acoustic signals to the set of frequencies from the second acoustic signals to determine a maximum difference in Doppler shifts between the first acoustic signals and the second acoustic signals; and
determining a location of the stationary acoustic source in the wellbore based on the maximum difference in Doppler shifts between the first acoustic signals and the second acoustic signals.

2. The method of claim 1, wherein the stationary acoustic source is a leak.

3. The method of claim 1, further comprising:
receiving, by a third hydrophone of the tool moved relative to the stationary acoustic source, third acoustic signals generated by the stationary acoustic source; and
confirming the location of the stationary acoustic source in the wellbore based on differences in Doppler shifts between the third acoustic signals and the first acoustic signals.

4. The method of claim 1, wherein determining a location of the stationary acoustic source in the wellbore based on the maximum difference in Doppler shifts between the first acoustic signals and the second acoustic signals comprises:
determining a location of the tool corresponding to the maximum difference in Doppler shifts between the first acoustic signals and the second acoustic signals; and
associating the location of the stationary acoustic source with the location of the tool.

5. The method of claim 1, wherein the tool moving relative to the stationary acoustic source disposed in the wellbore comprises the tool translating relative to the stationary acoustic source disposed in the wellbore.

6. The method of claim 1, wherein the tool moving relative to the stationary acoustic source disposed in the wellbore comprises the tool translating and rotating relative to the stationary acoustic source disposed in the wellbore.

7. The method of claim 1, wherein receiving, by the first hydrophone of the tool moving relative to the stationary acoustic source disposed in the wellbore, the first acoustic signals generated by the stationary acoustic source comprises receiving the first acoustic signals during a timeframe in which the tool is moving relative to the stationary acoustic source.

8. The method of claim 1, wherein receiving, by the first hydrophone of the tool moving relative to the stationary acoustic source disposed in the wellbore, the first acoustic signals generated by the stationary acoustic source comprises receiving, after a timeframe in which the tool is moving relative to the stationary acoustic source, the first acoustic signals that are obtained by the first hydrophone and stored during the timeframe in which the tool is moving relative to the stationary acoustic source.

9. A computer program product for locating a stationary acoustic source in a wellbore, the computer program product comprising a non-transitory computer readable storage medium readable by a processing device and storing instructions for execution by the processing device for performing a method comprising:
    moving, by the processing device, a tool relative to a stationary acoustic source disposed in a wellbore;
    receiving, by the processing device, using a first hydrophone of the tool moving relative to the stationary acoustic source disposed in the wellbore, first acoustic signals generated by the stationary acoustic source;
    receiving, by the processing device, using a second hydrophone of the tool moving relative to the stationary acoustic source, second acoustic signals generated by the stationary acoustic source, wherein each of the first acoustic signals and the second acoustic signals comprises a set of frequencies;
    comparing, by the processing device, the set of frequencies from the first acoustic signals to the set of frequencies from the second acoustic signals to determine a maximum difference in Doppler shifts between the first acoustic signals and the second acoustic signals; and
    determining, by the processing device, a location of the stationary acoustic source in the wellbore based on the maximum difference in Doppler shifts between the first acoustic signals and the second acoustic signals.

10. The computer program product of claim 9, wherein the method further comprises:
    receiving, by a third hydrophone of the tool moving relative to the stationary acoustic source, third acoustic signals generated by the stationary acoustic source; and
    confirming the location of the stationary acoustic source in the wellbore based on differences in Doppler shifts between the third acoustic signals and the first acoustic signals.

11. The computer program product of claim 9, wherein determining the location of the stationary acoustic source in the wellbore based on the maximum difference in Doppler shifts between the first acoustic signals and the second acoustic signals comprises:
    determining a location of the tool corresponding to the maximum difference in Doppler shifts between the first acoustic signals and the second acoustic signals; and
    associating the location of the stationary acoustic source with the location of the tool.

12. The computer program product of claim 9, wherein the tool moving relative to the stationary acoustic source disposed in the wellbore comprises the tool translating relative to the stationary acoustic source disposed in the wellbore.

13. The computer program product of claim 9, the tool moving relative to the stationary acoustic source disposed in the wellbore comprises the tool translating and rotating relative to the stationary acoustic source disposed in the wellbore.

14. The computer program product of claim 9, wherein receiving, by the first hydrophone of the tool moving relative to the stationary acoustic source disposed in the wellbore, the first acoustic signals generated by the stationary acoustic source comprises receiving the first acoustic signals during a timeframe in which the tool is moving relative to the stationary acoustic source.

15. The computer program product of claim 9, wherein receiving, by the first hydrophone of the tool moving relative to the stationary acoustic source disposed in the wellbore, the first acoustic signals generated by the stationary acoustic source comprises receiving, after a timeframe in which the tool is moving relative to the stationary acoustic source, the first acoustic signals that are obtained by the first hydrophone and stored during the timeframe in which the tool is moving relative to the stationary acoustic source.

16. A downhole assembly, comprising:
    a body;
    a first hydrophone coupled with the body at a first position, the first hydrophone operable to receive an acoustic signal generated by a stationary acoustic source disposed in a wellbore and output first information;
    a second hydrophone coupled with the body at a second position different from the first position, the second hydrophone operable to receive the acoustic signal generated by the stationary acoustic source and output second information, wherein the first information and the second information each comprise a set of frequencies; and
    a communications unit communicatively coupled with the first hydrophone and the second hydrophone so as to communicate the first information and the second information for comparing the set of frequencies from the first information and the second information to determine a maximum difference in Doppler shifts between the first information and the second information and determine a location of the stationary acoustic source in the wellbore based on the maximum difference in Doppler shifts of the first information and the second information.

17. The downhole assembly of claim 16, further comprising a third hydrophone coupled with the body at a third position different from the first position and the second position, the third hydrophone operable to receive the acoustic signal generated by the stationary acoustic source and output third information; and
    wherein the communications unit is further communicatively coupled with the third hydrophone so as to communicate the third information for confirming the location of the stationary acoustic source in the wellbore based on differences between Doppler shifts of the third information and the first information.

18. The downhole assembly of claim 16, further comprising a motion unit coupled with the body so as to cause translation of the first hydrophone relative to the stationary acoustic source.

19. The downhole assembly of claim 16, further comprising a motion unit coupled with the body so as to cause translation and rotation of the first hydrophone relative to the stationary acoustic source.

20. The downhole assembly of claim 16, wherein the communications unit is communicatively coupled with the first hydrophone and the second hydrophone so as to communicate the first information and the second information during a timeframe in which the body is moving relative to the stationary acoustic source.

21. The downhole assembly of claim 16, wherein the communications unit is communicatively coupled with the first hydrophone and the second hydrophone so as to store the first information and the second information during a timeframe in which the body is moving relative to the stationary acoustic source and communicate the stored first information and second information after the timeframe in which the body is moving relative to the stationary acoustic source.

* * * * *